(12) United States Patent
Sasaki

(10) Patent No.: US 7,586,821 B2
(45) Date of Patent: *Sep. 8, 2009

(54) DATA STORAGE APPARATUS THAT EITHER CERTIFIES A RECORDING MEDIUM IN THE BACKGROUND OR VERIFIES DATA WRITTEN IN THE RECORDING MEDIUM

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/477,375

(22) Filed: Jun. 30, 2006

(65) Prior Publication Data
US 2006/0245324 A1    Nov. 2, 2006

Related U.S. Application Data

(63) Continuation of application No. 10/128,455, filed on Apr. 24, 2002, now Pat. No. 7,133,339.

(30) Foreign Application Priority Data
Apr. 25, 2001    (JP)    ............................. 2001-127592

(51) Int. Cl.
*G11B 20/10*    (2006.01)
*G11B 20/12*    (2006.01)
(52) U.S. Cl. ............... 369/53.17; 369/30.21; 369/53.15
(58) Field of Classification Search .............. 369/53.15, 369/53.17, 30.21, 53.36, 275.3, 30.07, 53.21, 369/53.24, 47.14, 47.1, 53.41; 711/103; 714/710, 718
See application file for complete search history.

(56) References Cited

U.S. PATENT DOCUMENTS

| 4,924,330 A | 5/1990 | Seamons et al. |
| 5,132,956 A | 7/1992 | Ichikawa |

(Continued)

FOREIGN PATENT DOCUMENTS

EP    0364 176    4/1990

(Continued)

OTHER PUBLICATIONS

Mount Rainer Promoters, "CD-RW Multi-media Command Set Modifications for the Mount Rainer RW Format", Aug. 29, 2000.

(Continued)

*Primary Examiner*—William J Klimowicz
*Assistant Examiner*—Kim-Kwok Chu
(74) *Attorney, Agent, or Firm*—Dickstein Shapiro LLP

(57) ABSTRACT

A data storage apparatus, which can format a recording medium in the background, that verifies data written in a designated region of the recording medium if the designated region has not yet been certified in the background, and writes the data in an alterative region of the recording medium if the designated region is found defective. Since the data storage apparatus either certifies the designated region of the recording medium or verifies the data written in the designated region, the data storage apparatus can enhance the reliability of the data written in the recording medium, but the data storage apparatus does not waste time by verifying the designated region of the recording medium two times or more.

6 Claims, 7 Drawing Sheets

U.S. PATENT DOCUMENTS

| | | |
|---|---|---|
| 5,237,553 A | 8/1993 | Fukushima et al. |
| 5,319,626 A | 6/1994 | Ozaki et al. |
| 5,404,357 A | 4/1995 | Ito et al. |
| 5,532,992 A | 7/1996 | Funamoto |
| 5,546,556 A | 8/1996 | Matsushita |
| 5,623,470 A | 4/1997 | Asthana et al. |
| 5,740,356 A | 4/1998 | Liang et al. |
| 5,914,928 A | 6/1999 | Takahashi |
| 5,978,336 A | 11/1999 | Mine et al. |
| 6,172,955 B1 | 1/2001 | Hashimoto |
| 6,205,099 B1 | 3/2001 | Sasaki et al. |
| 6,243,338 B1 * | 6/2001 | Mine .................. 369/47.1 |
| 6,314,072 B1 | 11/2001 | Ohmi |
| 6,473,380 B1 | 10/2002 | Takahashi |
| 6,557,125 B1 | 4/2003 | Rochat et al. |
| 6,606,285 B1 | 8/2003 | Ijtsma et al. |
| 6,621,782 B1 | 9/2003 | Nakane et al. |

FOREIGN PATENT DOCUMENTS

| | | |
|---|---|---|
| EP | 0878 799 | 11/1998 |
| EP | 0 899 735 | 3/1999 |
| JP | 02-183473 | 7/1990 |
| JP | 03-232164 | 10/1991 |
| JP | 7-176142 | 7/1995 |
| JP | 8-203211 | 8/1996 |
| JP | 11-134799 | 5/1999 |
| WO | WO 01/22416 | 3/2001 |

OTHER PUBLICATIONS

ECMA: Standardizing Information and Communication Systems, Standard ECMA-330:120 mm (4,7 Gbytes per side) and 80 mm (1,46 Gbytes per side) DVD Rewritable Disk (DVD-RAM), Dec. 2001.

Anonymous, "Mount Ranier Drag and Drop Data on DC-RW", the Mount Rainier Solution, Internet article, Jul. 3, 2001.

* cited by examiner

DATA STORAGE APPARATUS THAT EITHER CERTIFIES A RECORDING MEDIUM IN THE BACKGROUND OR VERIFIES DATA WRITTEN IN THE RECORDING MEDIUM

This application is a continuation of application Ser. No. 10/128,455, filed on Apr. 24, 2002, now U.S. Pat. No. 7,133,339 which is hereby incorporated by reference in its entirety.

BACKGROUND OF THE INVENTION

1. Field of the Invention

The present invention relates to a data storage apparatus, and more particularly, to a data storage apparatus that stores data designated by a user in rewritable recording media such as CD-RW (Compact Disc-ReWritable) and DVD+RW (Digital Video or Versatile Disc+ReWritable).

2. Description of the Related Art

Universal Disc Format (UDF) is a standard file system for rewritable data storage media such as CD-RW and DVD+RW. UDF is applicable to various data storage apparatuses since UDF uses various recording formats suitable to respective recording media.

Among UDF, random UDF is used for CD-RW and DVD+RW that are randomly accessible as well as rewritable.

In the case of CD-RW, it is necessary to format a disk by writing dummy data in the entire recording region or at least a designated recording region of the disk in order to write or to read data at random. In the case of DVD+RW, an unrecorded region of a disk also must be formatted by storing dummy data in advance to establish compatibility with conventional DVD-ROM drives.

Another object of formatting is to detect an inherent defect in the disk in order to avoid the writing of data in the defective region when real data are written.

That is, a data storage apparatus verifies the dummy data written in the entire region of the disk that has been formatted. This is called certifying processing.

A sector in which a defect is found by the certifying processing is registered as a defective sector, and its information is stored in a predetermined area of the disk. In the case that the defective sector is to be accessed for the writing or reading of data, another sector in which no defect was found by certifying is accessed on behalf of the defective sector. A method of detecting a defective sector in a disk is described in Japanese Laid-open Patent Application No. 7-176142, for example, as related art.

As described above, while a disk is being formatted, the data storage apparatus writes dummy data in the entire region or at least a designated region of the disk and verifies the dummy data, if necessary. The time required for formatting the disk increases proportionally to the increase of memory capacity of the disk.

As a solution to this problem, a data storage apparatus that performs the formatting of a CD-RW disk and/or a DVD+RW disk in the background so that a user could write and/or read data in a short time period after the user requests to format the disk is proposed in the Japanese Laid-open Patent Application No. 11-134799, for example.

While no user data are being written or read in the disk, the proposed data storage apparatus writes dummy data in an unformatted region, or verifies the dummy data written in a formatted region to certify the formatted region. If the user requests to write/read user data while the disk is being formatted in the background, the data storage apparatus temporarily stops (suspends) the formatting processing and writes/reads the user data in compliance with the user's request.

Accordingly, the data storage apparatus, while formatting the disk in the background, performs the writing and reading of the user data, the writing of the dummy data, and the detecting of a defective sector by the certifying processing in parallel.

In the case of the formatting in the background according to related art, however, the data storage apparatus writes user data in an uncertified region, which may be a defective sector. If the uncertified region is defective, the user data may be lost.

SUMMARY OF THE INVENTION

Accordingly, it is a general object of the present invention to provide a novel and useful data storage apparatus in which one or more of the problems described above are eliminated.

Another and more specific object of the present invention is to provide a data storage apparatus that can securely write user data even during the background formatting of the disk.

To achieve one of the above objects, a data storage apparatus that certifies a recording medium in background by writing dummy data in said recording medium and verifying said dummy data, according to the present invention is structured by a buffer unit that temporarily stores data provided from an exterior, and a controller unit that receives a request from said exterior to write said data in a designated region of said recording medium, writes said data in said designated region, determines whether said designated region has been certified, verifies, if said designated region has not been certified, said data written in said designated region by comparing with the buffered data, and writes, if a portion of said designated region is found to be defective, the portion of the buffered data corresponding to data written in the defective portion of said designated region, in a predetermined alternative region of said recording medium.

Since the data storage apparatus according to the present invention either certifies the designated region of the recording medium while the designated region is formatted in the background or verifies the data written in the designated region of the recording medium, the data storage apparatus can enhance the reliability of the data written in the recording medium, but the data storage apparatus does not waste time verifying the designated region of the recording medium twice or more.

Other objects, features, and advantages of the present invention will become more apparent from the following detailed description when read in conjunction with the accompanying drawings.

DETAILED DESCRIPTION OF THE PREFERRED EMBODIMENTS

The preferred embodiments of the present invention will be described below by reference to drawings.

Figure 1:
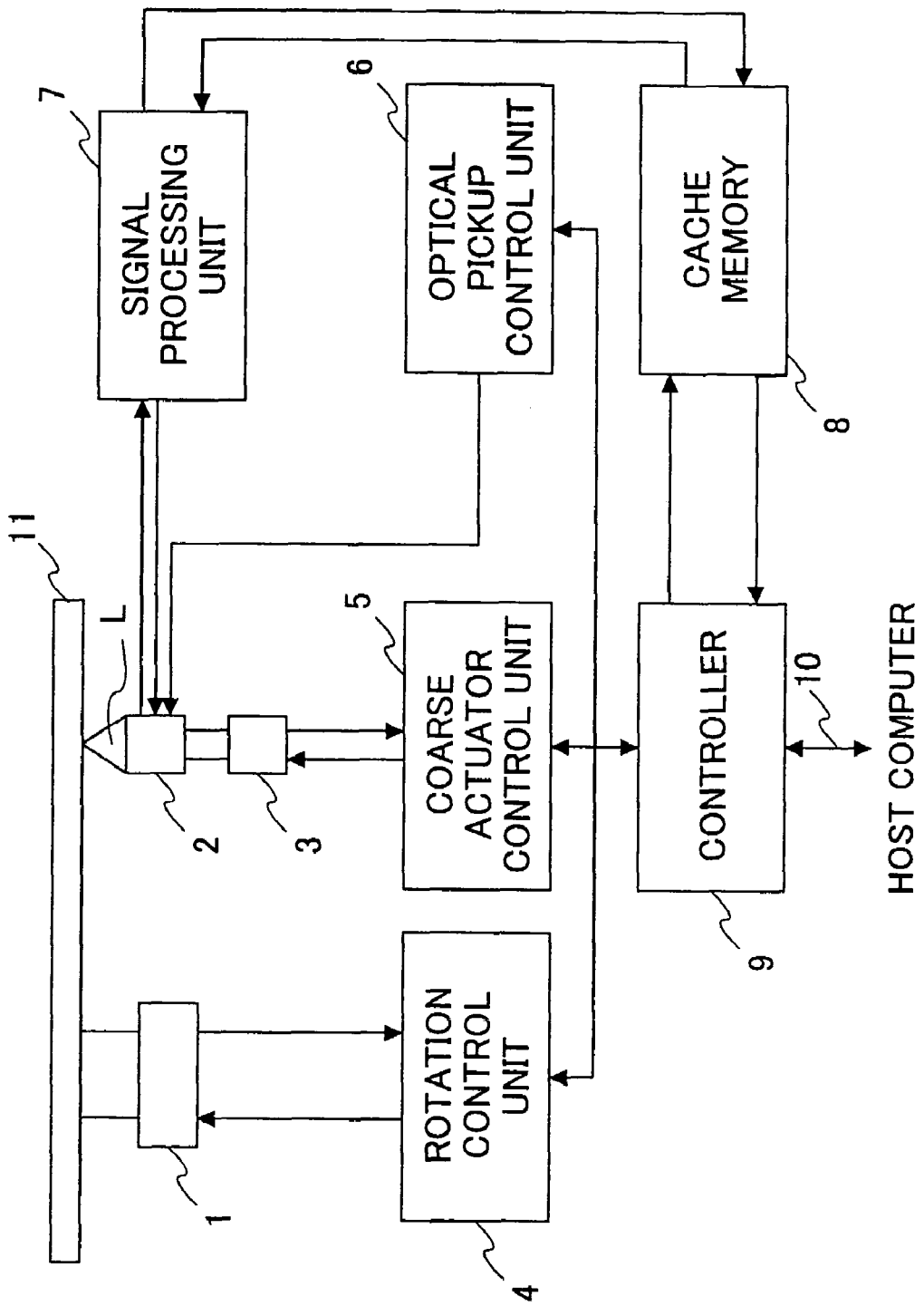
FIG. 1 is a block diagram showing an optical disk drive as an embodiment of the present invention.

FIG. 1 is a block diagram of an optical disk drive as an embodiment of the present invention.

The optical disk drive as an embodiment of the present invention is provided with a spindle motor (hereinafter referred to as a "motor") 1 that rotates an optical disk 11 such as CD, CD-R, CD-RW, and DVD, an optical pickup 2 having a semiconductor laser that applies a laser beam L to a recording region of the optical disk 11, and a coarse actuator 3 that actuates the optical pickup 2 in the radial direction of the optical disk 11 in collaboration with a seek motor (not shown) provided in the optical pickup 2.

The optical disk drive showed in FIG. 1 is further provided with a rotation control unit 4 that controls the rotation of the motor 1, a coarse actuator control unit 5 that activates the coarse actuator 3, an optical pickup control unit 6 that controls the optical pickup 2, and a signal processing unit 7 that processes a signal read by the optical pickup 2 from the recording region of the optical disk 11 and a signal to be written by the optical pickup 2 in the recording region of the optical disk 11.

The optical disk drive showed in FIG. 1 is further provided with a cache memory 8 that temporarily stores data read from the optical disk 11, and a controller 9 consisting of electronic components such as a CPU, ROM, and RAM, that perform various processing in connection with the present invention as well as the controlling of the other control units 4, 5, and 6 and the signal processing unit 7.

The controller 9 is connected with a host computer through an external interface 10 so that the controller 9 transmits user data read from the optical disk 11 to the host computer in response to a request from the host computer and receives user data to be written in the optical disk 11 from the host computer.

The optical disk drive showed in FIG. 1 performs the background formatting as an embodiment of the present invention as well as the reading and writing of user data by rotating the optical disk 11 by the motor 1, actuating the optical pickup 2 in the radial direction of the optical disk 11, and applying the laser beam L emitted by the semiconductor laser provided in the optical pickup 2 to the recording region of the optical disk 11.

In the case of the writing of information, the information received from the host computer through the external interface is temporarily stored in the cache memory 8, and is converted into a write signal by the signal processing unit 7. The write signal is recorded in the optical disk 11 by applying a laser beam L by the optical pickup 2 to the recording region of the optical disk 11.

In the case of the reading of information, the information read from the recording region of the optical disk 11 in response to a request from the host computer is temporarily stored in the cache memory 8, and is transferred to the host computer through the external interface 10.

That is, the controller 9 and the other components showed in FIG. 1 read and write information in a recording medium and format the recording medium in the background by writing dummy data in the recording medium while no information is to be read or written. The formatted region of the recording medium is certified by verifying the dummy data written in the formatted region. In the case that the host computer requests to write information while the recording medium is being formatted in the background, the recorded region of the recording medium is certified by verifying whether any defect exists in the recorded region. If a defect is found in the recorded region by certifying, the information written in the defective region is written again in a predetermined alterative region (relocating processing).

In the case of the writing of information to a recording region of the recording medium, the controller 9 determines whether the recording region has been certified and, if the recording region has been certified, does not verify the information recorded in the recording region.

Furthermore, in the case of the writing of information to a recording region of the recording medium, the controller 9 determines whether the optical disk drive is set at the mode in which the formatted region is to be certified or not. If the controller 9 determines that the optical disk drive is set at the mode in which the formatted region is not to be certified, the controller 9 does not verify the information written in the recording region.

Furthermore, the controller 9 determines, when information is to be written in the recording medium, whether the information is classified as one that needs to be written again (relocated) in an alternative recording region if the recording region where the information has been written is found defective. If the information does not need to be recorded in an alternative recording region, the controller 9 does not verify the information that has been written in an uncertified recording region.

Additionally, the information indicating whether the written information is to be relocated (written again in the predetermined alternative region) can be transferred from the host computer by setting the information as a mode parameter or sending the information as a command parameter before the user data are transferred from the host computer to the optical disk drive.

The ordinary background formatting of a DVD+RW disk will be described next before describing the background formatting according to the present invention in more detail.

FIGS. 2A through 2E are schematic drawings showing how dummy data of the background formatting and user data are written and read in a DVD+RW disk, the optical disk 11.

Figure 2:
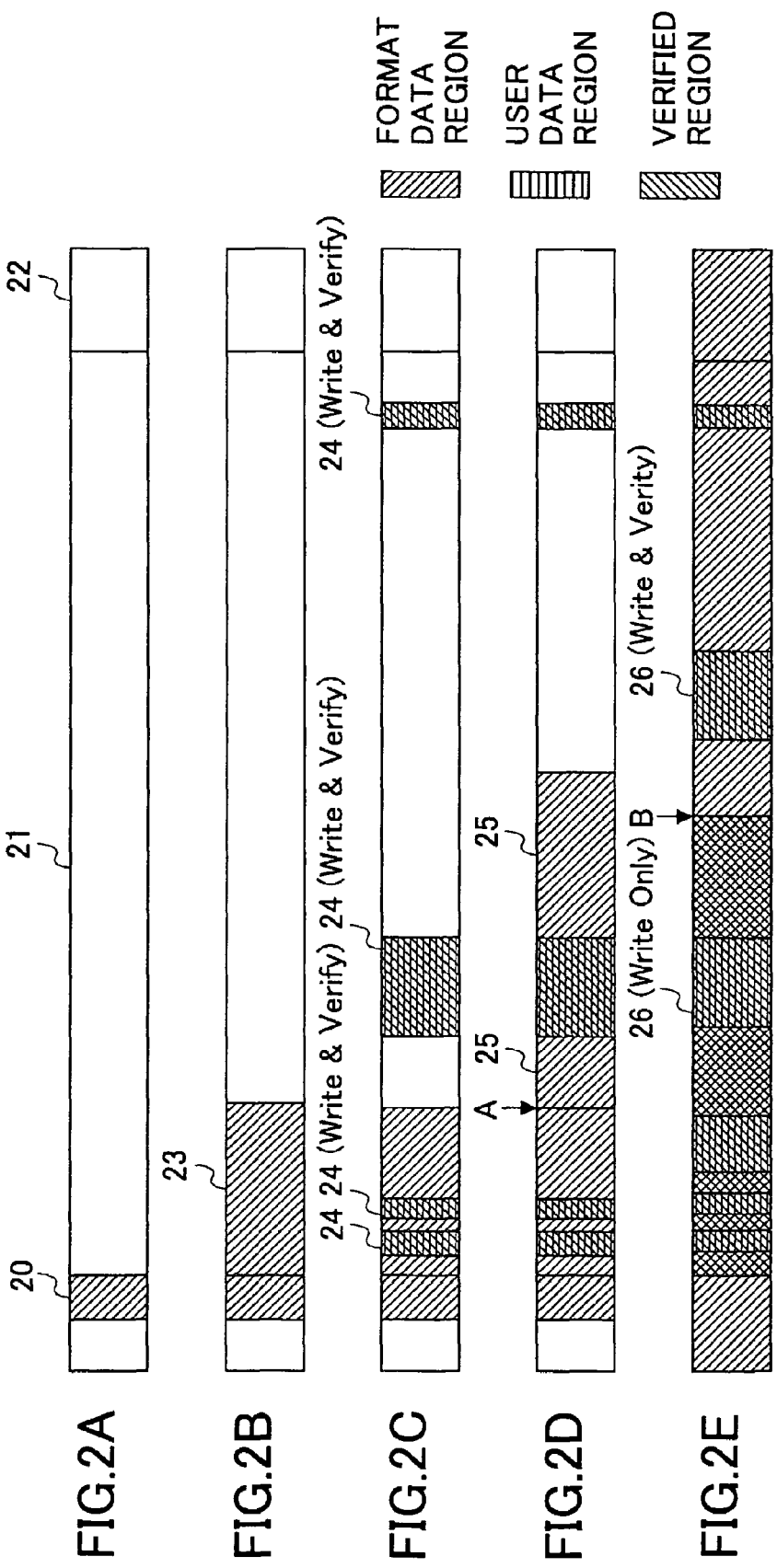
FIGS. 2A through 2E are schematic drawings showing how dummy data and user data are written or read in a DVD+RW disk by the optical disk drive as an embodiment of the present invention.

As shown in FIG. 2A, when an unformatted optical disk 11 (a blank disk) is inserted into the optical disk drive, a portion of a lead-in area (lead-in region) 20 is formatted with a predetermined format as an initialization of the formatting processing of data recording region. User data can be written in a user data area 21 in response to a request from the host computer after this initialization. A lead-out area 22 is provided in the rear of the user data area 21.

As shown in FIG. 2B, the optical disk drive starts the background formatting of the blank disk if no request from the host computer to write and read user data has been received by recording dummy data in an unrecorded region 23 in the inner radius of the optical disk 11.

As shown in FIG. 2C, if the host computer requests to write user data in the optical disk 11 while the background formatting is proceeding, the background formatting (the writing of the dummy data) is suspended, and the user data are written in recording regions 24 designated by the host computer.

As shown in FIG. 2D, after finishing the writing of the user data in the designated regions 24, the background formatting is resumed from the address indicated by a letter "A" at which the background formatting was suspended, and dummy data are recorded in recording regions 25.

After finishing the writing of the dummy data in unrecorded regions, the optical disk drive starts certifying from the head of the recording region. As shown in FIG. 2E, if the host computer requests to write user data in designated recording regions 26 when the certifying has been performed up to the address indicated by a letter "B", the certifying processing is suspended, and the user data are recorded in the recording regions 26 designated by the host computer.

The certifying processing is resumed from the address B at which the certifying was suspended. If a defective recording region (sector) is found, the user data written in the defective recording region are written again (relocated) in a predetermined alternative region provided in the optical disk 11.

The operation of the controller 9 as an embodiment of the present invention described in claim 1 will be explained below.

Figure 3:
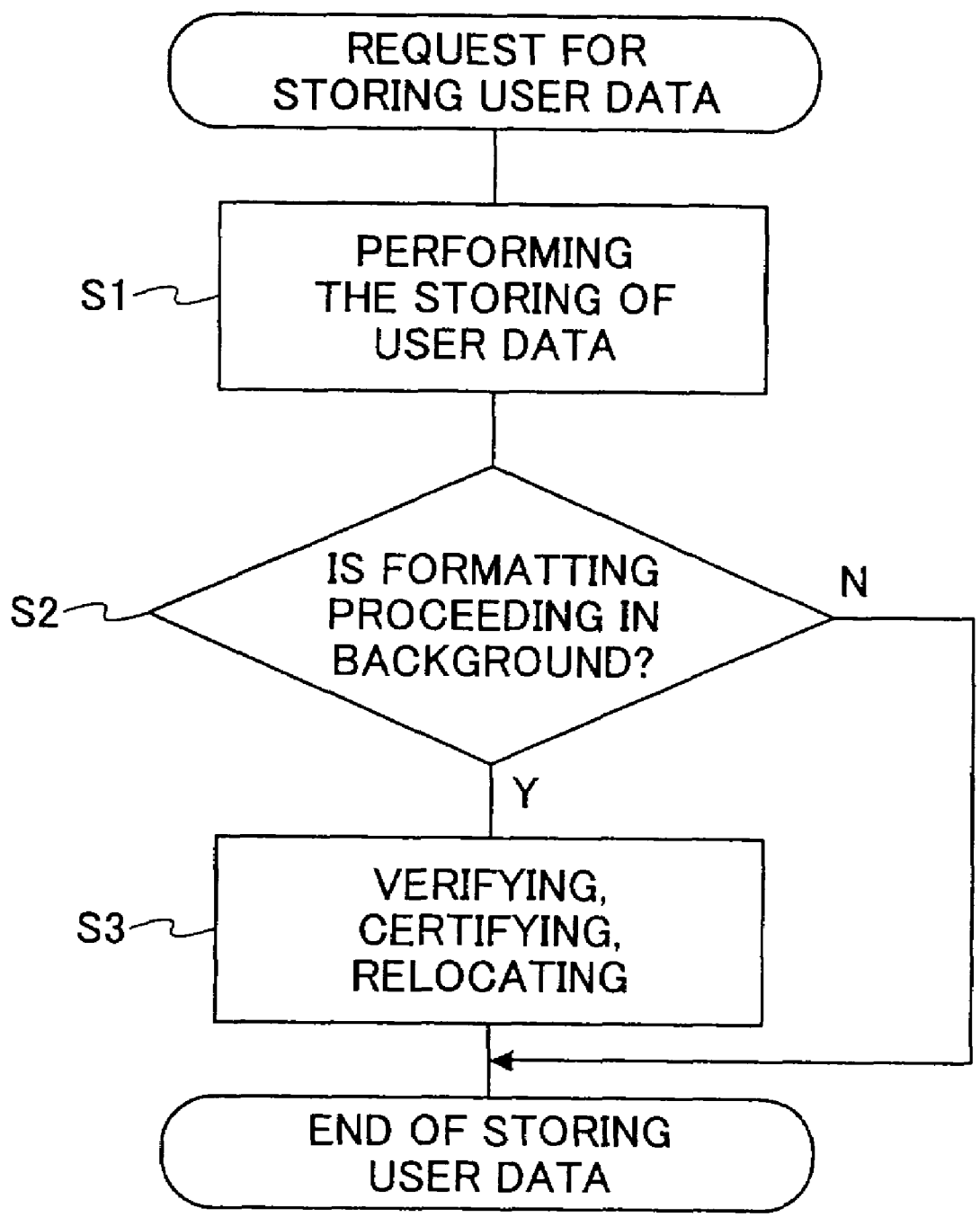
FIG. 3 is a flow diagram showing the operation of an optical disk drive as an embodiment of the present invention.

FIG. 3 is a flow diagram showing the operation performed when the recording of user data is requested, as an embodiment of the present invention claimed in claim 1.

When the host computer requests the writing of user data, the optical disk drive writes the user data in a recording region designated by the host computer in the request (step S1). The optical disk drive determines whether the background formatting has been suspended (step S2).

If the optical disk drive determines that the background formatting has not been suspended in step S2, the optical disk drive finishes the performance responding to the request to write the user data.

If the optical disk drive determines that the background formatting is being suspended in step S2, the optical disk drive certifies the recording region of the optical disk 11 by verifying the user data written in the recording region (step S3). If a defect is found in the certifying process, the user data are written in an alternative recording region of the optical disk 11 (relocating processing).

In summary, unless the host computer requests to write or read user data, the optical disk drive keeps formatting the optical disk 11 in the background. Once the host computer requests to write user data, the optical disk drive suspends the formatting of the optical disk 11, and writes the user data in the designated recording region of the optical disk 11. Then, the optical disk drive certifies whether any defect exists in the designated recording region of the optical disk 11 by verifying the written user data. If a defect is found in the designated recording region, the optical disk drive writes the user data written in the defective recording region again in a predetermined alternative recording region in the disk 11 (relocating processing). After this certifying process, the optical disk drive resumes formatting the remainder of the optical disk 11 in the background.

Accordingly, the optical disk drive as an embodiment of the present invention can guarantee the reliability of user data written during the background formatting by verifying the user data to find any defect existing in the recording region where the user data have been written.

If the recording region in which the user data are written has been certified during the background formatting of the recording region, the verifying processing of the written user data is not necessary.

Processing connected to another suspect of the present invention that is performed by the controller 9 of the optical disk drive will be described next.

Figure 4:
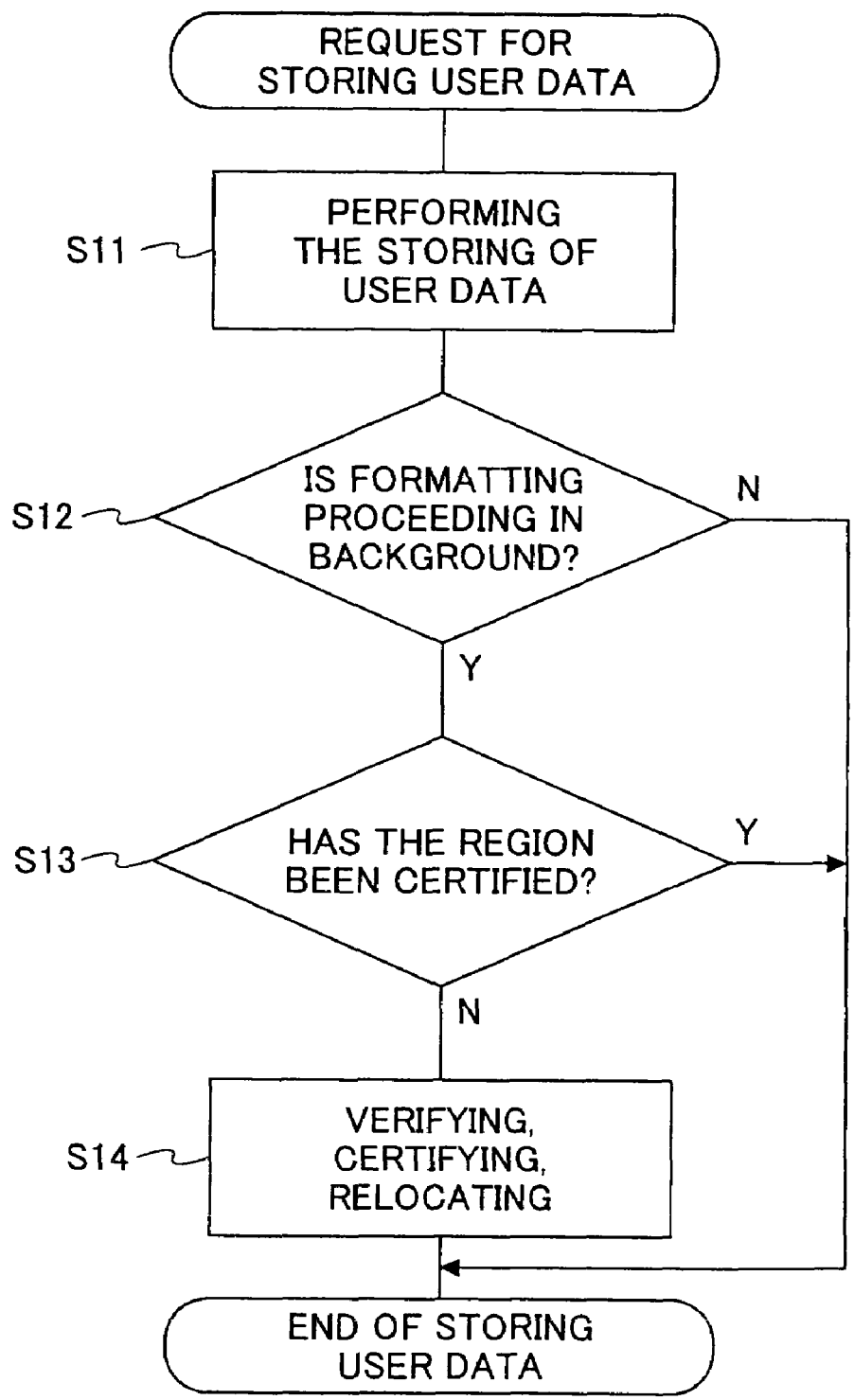
FIG. 4 is a flow diagram showing an operation of an optical disk drive as another embodiment of the present invention.

FIG. 4 is a flow diagram showing the processing connected to another aspect of the present invention that is performed when the host computer requests to write user data.

When the host computer requests the writing of user data, the optical disk drive writes the user data in a recording region designated by the host computer in the request (step S11). The optical disk drive determines whether the background formatting has been suspended (step S12).

If the optical disk drive determines that the background formatting has not been suspended in step S12, the optical disk drive finishes the request for the writing of user data.

If the optical disk drive determines that the background formatting is being suspended in step S12, the optical disk drive further determines whether the recording region where the user data are written has been certified when the recording region was formatted (step S13). If the optical disk drive determines that the recording region where the user data is written has been certified in step S13, the optical disk drive finishes the request for the writing of user data.

If the optical disk drive determines that the recording region where the user data is written has not been certified yet in step S13, the optical disk drive certifies the recording region where the user data are written in order to find any defect by verifying the user data. If no defect is found, the optical disk drive finishes the request for the writing of the user data. If a defect is found, the optical disk drive writes the user data written in the defective recording region again in a predetermined alternative recording region, before finishing the request for the writing of the user data.

In summary, unless the host computer requests to write or read user data, the optical disk drive keeps formatting the optical disk 11 in the background. Once the host computer requests to write user data, the optical disk drive suspends the formatting of the optical disk 11, and writes the user data in the designated recording region of the optical disk 11. In this case, the optical disk drive determines whether a designated recording region has been certified. If the recording region has been certified, the optical disk drive does not verify the user data written in the recording region. If the recording region has not been certified, the optical disk drive verifies the user data written in the recording region in order to find any defect existing in the recording region. If any defect is found in the recording region, the user data is written again in a predetermined recording region of the optical disk 11 (relocating processing). Then, the suspended background formatting is resumed.

As described above, the optical disk drive as an embodiment of the present invention does not verify the user data that are written in a certified recording region, so that the optical disk drive does not repeat an unnecessary verification and reduces the time required for the writing of the user data.

Ordinarily, if a user does not need to relocate user data written in a defective recording region to a predetermined recording region of the optical disk 11, the user probably does not need to certify the optical disk 11 when the optical disk 11 is formatted. It would be useful for the user if the user could select whether to certify the optical disk 11 when the optical disk is formatted. Accordingly, it would be useful for the user if the user could determine, when the optical disk drive starts formatting, whether to certify the optical disk 11. If the user does not need to certify the optical disk 11 when formatting the optical disk 11 in the background, the optical disk drive does not need to verify the user data written in the recording region.

The processing performed by the controller 9 and other components of the optical disk drive, connected with another aspect of the present invention will be described next.

Figure 5:
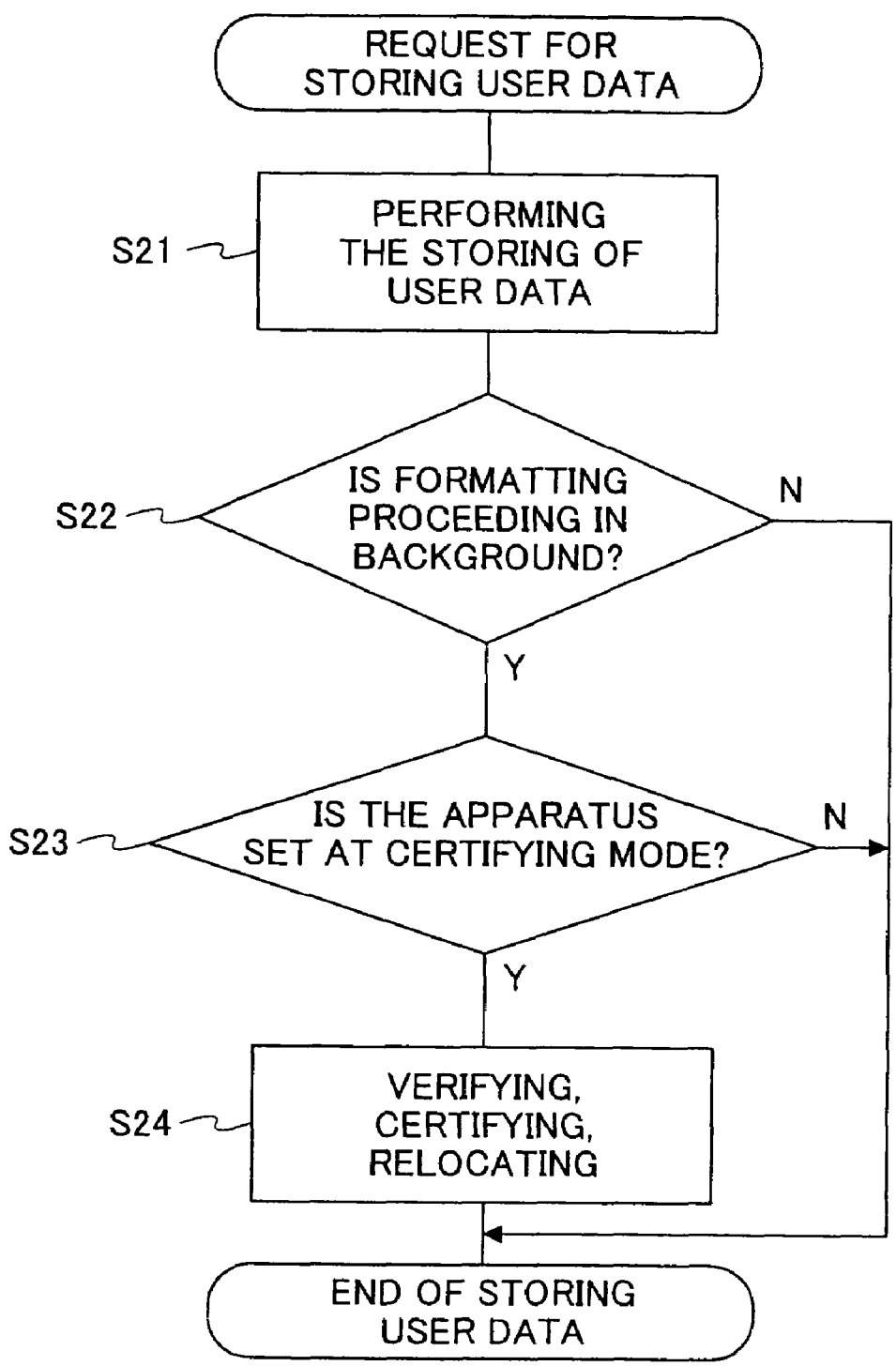
FIG. 5 is a flow diagram showing an operation of an optical disk drive as yet another embodiment of the present invention.

FIG. 5 is a flow diagram showing the processing that is performed when the host computer requests the optical disk drive to write user data.

When the host computer requests the optical disk drive to write user data, the optical disk drive writes the user data in a recording region designated by the host computer in the request (step S21). The controller 9 determines whether the background formatting has been suspended (step S22).

If the controller 9 determines that the background formatting has not been suspended in step S22, the optical disk drive finishes the performance responding to the request of the host computer.

If the controller 9 determines that the background formatting has been suspended in step S22, the controller 9 further determines whether the optical disk drive is set at a certifying mode in which certifying processing is required (step S23). If the controller 9 determines that the optical disk drive is not set at the certifying mode in step S23, the controller 9 finishes the performance responding to the request of the host computer.

If the controller 9 determines that the optical disk drive is set at the certifying mode, the controller 9 verifies the user data written in the designated region. If no defect is found, the controller 9 finishes the performance responding to the request of the host computer to write the user data. If any defect is found, the controller 9 performs relocating processing in which the user data written in the defective region is written again in a predetermined alternative region in the optical disk 11, and finishes the performance responding to the request of the host computer to write the user data.

In other words, when an unformatted optical disk 11 is set at the optical disk drive, the controller 9 of the optical disk drive starts formatting the unformatted optical disk 11 in the background. When the host computer requests the optical disk drive to write user data, the controller 9 suspends the background formatting and writes the user data in a recording region of the optical disk 11 designated by the host computer. The controller 9 determines whether the optical disk drive is set at the certifying mode in which certifying processing is required when the optical disk 11 is formatted. If the controller 9 determines that the optical disk drive is set at the non-certifying mode in which certifying processing is not required, the controller 9 resumes the formatting processing of the optical disk 11 after finishing the writing of the user data without certifying processing. If the controller 9 determines that the optical disk drive is set at the certifying mode, the controller 9 certifies the designated region by verifying the user data written in the designated region. If any defect is found in the designated region, the controller 9 relocates the user data by writing again the user data in a predetermined alternative region in the optical disk 11. Then, the controller 9 resumes the suspended background formatting of the optical disk 11.

In this case, if the controller 9 determines that the optical disk drive is set at the non-certifying mode, the controller 9 does not verify the user data written in the designated region. In this processing, the controller 9 can avoid repeating the unnecessary verification of the designated region and reduce processing time required to write the user data in the optical disk 11.

As described above, it is useful to verify the user data written in a designated region of the optical disk 11 if the designated region has not been certified yet during the background formatting. The verifying of the user data written in the designated region ensures the reliability of the user data, but increases time required to perform the writing of the user data responding to the request of the host computer.

In the case that a long series of data are to be written in consecutive addresses in the optical disk 11, however, the optical disk drive requires a long time to verify the sequential data since the controller 9 has to suspend writing to verify the sequential data. Frequent verifications greatly lower the performance of the optical disk drive. In the case of video data, for example, in which constant data transfer is more important than reliability of each piece of data, the verifying processing is not appropriate.

In this case where constant data transfer is required, it is preferred not to relocate user data even if a recording region where the user data are written contains a defective sector. If the optical disk drive has a mode in which relocating processing is not performed, the user can set the optical disk drive at the non-relocating mode when the user writes video data, for example, in the optical disk 11.

Processing of the controller 9 as an embodiment of the present invention according to another aspect of the invention will be described below.

Figure 6:
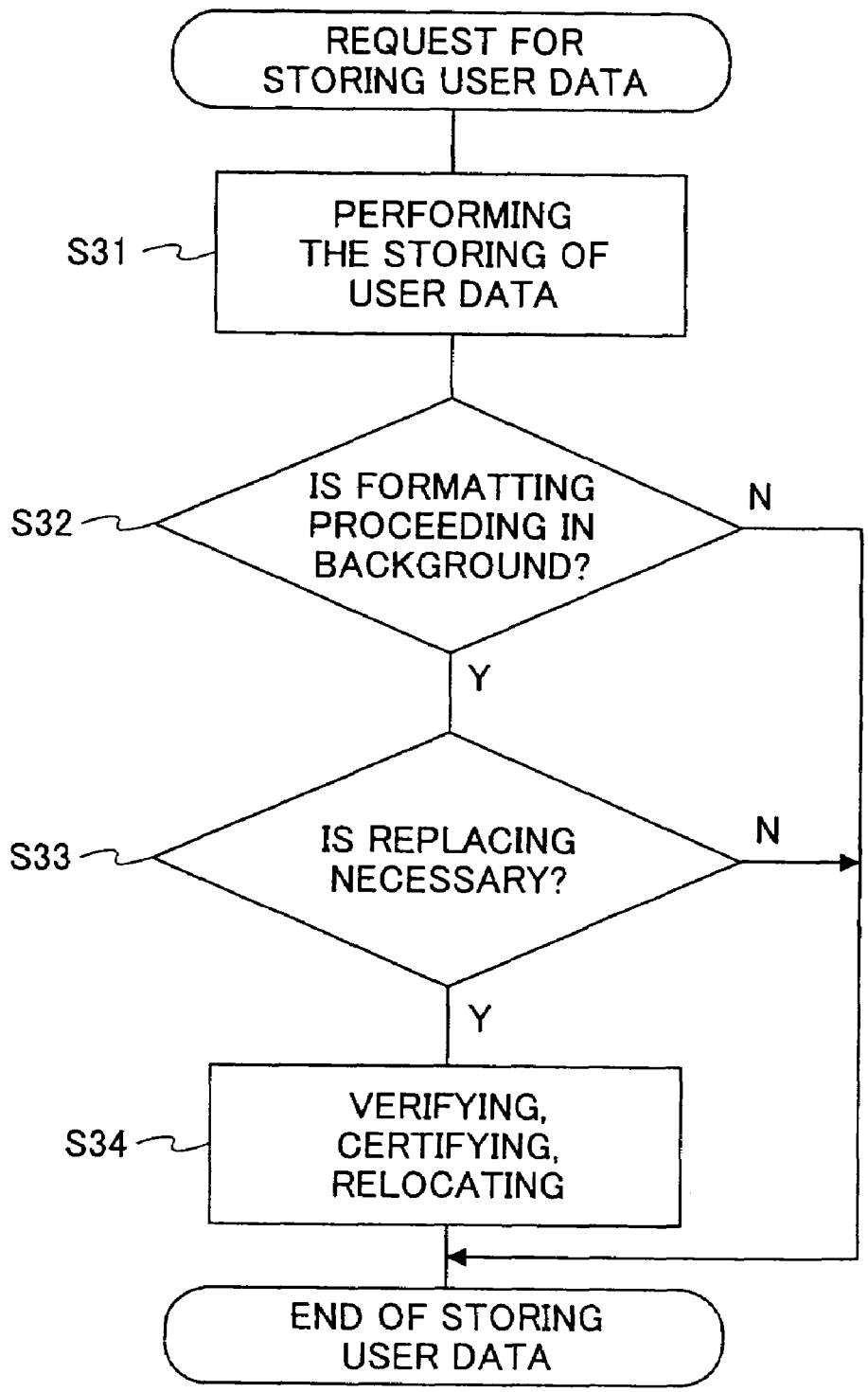
FIG. 6 is a flow diagram showing an operation of an optical disk drive as yet another embodiment of the present invention.

FIG. 6 is a flow diagram showing the processing performed when the writing of user data is requested as an embodiment of the present invention.

When the host computer requests the optical disk drive to write the user data in the optical disk 11, the controller 9 writes the user data in a designated region of the optical disk 11 (step S31). The controller 9 then determines whether the background formatting has been suspended (step S32).

If the controller 9 determines that the background formatting has not been suspended in step S32, the controller 9 finishes the performance responding to the request of the host computer.

If the controller 9 determines that the background formatting has been suspended in step S32, the controller 9 determines whether the optical disk drive is informed that the user data does not require the relocation processing (step S33). If the controller 9 determines that the optical disk drive is informed that the user data does not require the relocation processing in step S33 (that is, the optical disk drive is set at a mode in which the relocation processing is not performed), the performance responding to the request for the writing of user data is finished.

If the controller 9 determines that the optical disk drive is not informed that the user data does not require the relocation processing in step S33 (that is, the optical disk drive is set at a mode in which the relocation processing is performed), the controller 9 verifies the user data written in the designated region and performs the certifying processing (step S34). If no defect is found in the designated region, the performance responding to the request for the writing of user data is finished. If any defect is found in the designated region, the relocating processing is performed before the performance responding to the request to write user data is finished.

In summary, if the host computer does not request to read or write user data, the controller 9 starts formatting the optical disk 1 in the background by writing dummy data. If the host computer requests to write user data while the background formatting is performed, the controller 9 suspends the background formatting and starts writing the user data in the optical disk 11 as requested. The controller 9 determines whether an exterior system (the host computer or the optical disk drive, for example) has designated that the user data are to be relocated, if any defect is found by the certifying processing. After writing the user data, if the controller 9 has determined that the relocating processing is not necessary for the user data, the controller 9 resumes formatting the optical disk 11 without performing the certifying processing. If the user data requires the relocating processing, the controller 9 verifies the user data written in the designated region and performs the certifying processing by checking whether any defect exists based on the certifying processing. If any defect is found by the certifying processing, the user data written in the designated region are written in a predetermined alternative region of the optical disk 11 again. Then, the suspended background formatting is resumed.

The host computer can send a mode parameter to the optical disk drive before the optical disk drive starts writing the user data in order to inform the optical disk drive whether, if any defect is found by the certifying processing, the relocating processing is to be performed. The host computer sets the mode parameter indicating whether user data needs the relocating processing before the optical disk drive starts writing the user data. In step S33 of the operation described above, the controller 9 determines whether the mode parameter indicates that the relocating processing is necessary. If the controller 9 determines that the host computer designates a mode in which the relocating processing is not performed, the controller 9 finishes the performance responding to the request to write the user data. If the controller 9 determines that the host computer designates a mode in which the relocating processing is performed, the controller 9 performs step S34.

Instead of the mode parameter, the host computer can inform the optical disk drive whether the relocating processing is to be performed by setting a command parameter that is included in the command requesting to write the user data. The host computer indicates whether the user data requires the relocating processing when the host computer sends the request to write the user data in the command parameter. The controller 9 determines whether the relocating processing is required for the user data by checking the command parameter. If the relocating processing is not required, the controller 9 finishes the performance responding to the request to write the user data. If the relocating processing is necessary, the controller 9 performs step S34.

Accordingly, a user can select, if the user does not need the relocating processing, a mode where the verifying processing is not performed after writing the user data in the optical disk 11. This mode is effective for user data such that a constant transfer rate is required when the user data is written in the optical disk 11. Accordingly, the time required to write the user data can be reduced since the verifying processing is skipped.

Another embodiment of the present invention is described below.

Figure 7:
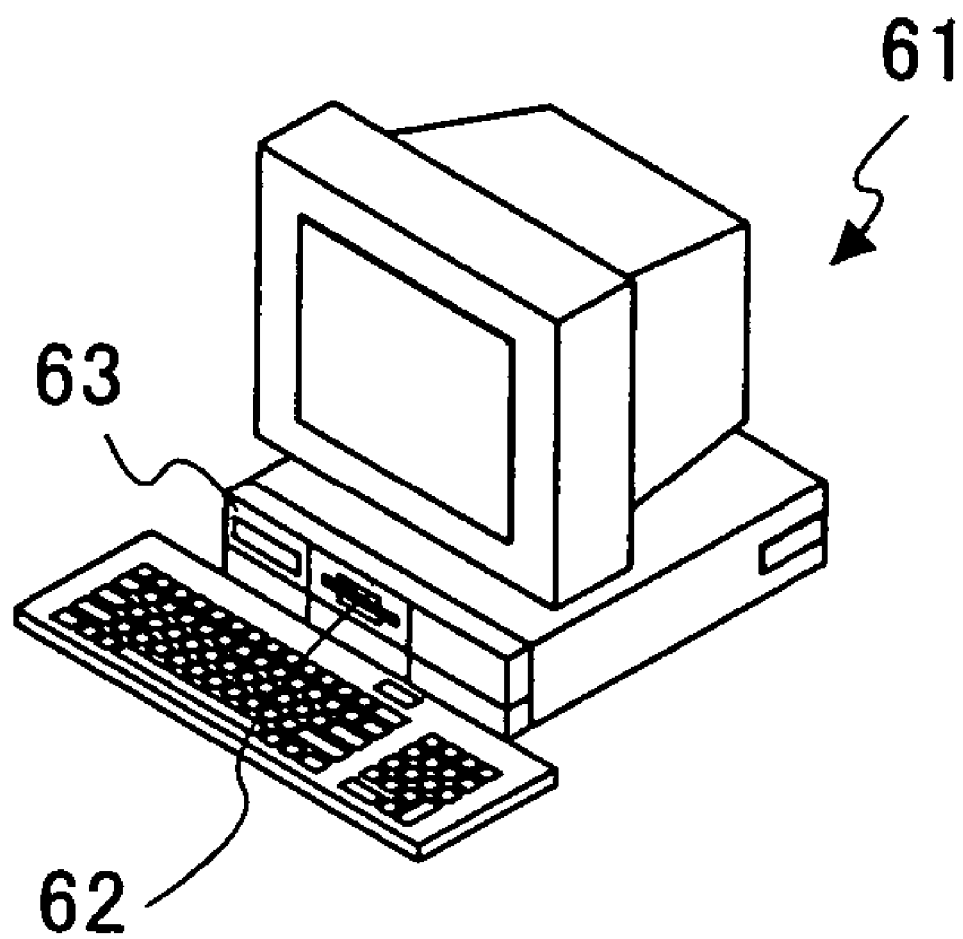
FIG. 7 is a schematic drawing showing an information processing system that is provided an optical disk drive as an embodiment of the present invention.

FIG. 7 is a schematic drawing showing a information processing apparatus such as a personal computer 61 as an embodiment of the present invention. The personal computer 61 is provided with a 3.5" floppy disk drive 62 as well as a DVD+RW drive 63, an example of the optical disk drive described above as an embodiment of the present invention. The DVD+RW drive 63 can be an embedded type or a so-called built-in type. The host computer is also provided in the personal computer 61.

This embodiment provides a personal computer 61 that can utilize the optical disk drive 63, which is described in each embodiment of the present invention, as a secondary storage apparatus.

The optical disk drive 63 is not necessarily included in the personal computer 61, but can be a stand-alone type connected to the information processing apparatus. The personal computer 61 is not necessarily a desk top type, but can be a notebook type.

As described above, the data storage apparatus according to the present invention can guarantee the reliability of the information written in a designated region of a recording medium in response to a user request while the data storage apparatus is formatting the recording medium in the background.

The preferred embodiments of the present invention are described above. The present invention is not limited to these embodiments, but various variations and modifications may be made without departing from the scope of the present invention.

This patent application is based on Japanese priority patent application No. 2001-127592 filed on Apr. 25, 2001, the entire contents of which are hereby incorporated by reference.

What is claimed is:

1. A data storage apparatus that certifies a recording medium, while waiting for a request from an exterior device, by using an optical disk drive for writing dummy data in said recording medium and verifying said dummy data in a background formatting process, while waiting for said request from the exterior device, comprising:
   a buffer unit that temporarily stores user data provided from said exterior device; and
   a controller unit that receives said request from said exterior device to write said user data in a designated region of said recording medium, suspends the background formatting process, by suspending the writing of said dummy data in said recording medium, if the background formatting process is in progress, writes said user data in said designated region, determines whether said designated region has been certified, verifies, if said designated region has not been certified, said user data written in said designated region, writes, if a portion of said designated region is found to be defective, a portion of the stored user data corresponding to the user data written in the defective portion of said designated region, in a predetermined alternative region of said recording medium, and resumes the background formatting process, by resuming the writing of said dummy data in said recording medium, if the background formatting process was suspended.

2. The data storage apparatus as claimed in claim 1, wherein said controller unit does not verify said data if said designated region has been certified.

3. The data storage apparatus as claimed in claim 1, wherein
   said data storage apparatus can be set at a mode in which said recording medium is not certified while waiting for a request from an exterior device; and
   said controller unit does not verify said user data if said data storage apparatus is set at said mode.

4. A controller unit that controls a data storage apparatus that certifies a recording medium by using an optical disk drive for writing dummy data in said recording medium and verifying said dummy data in a background formatting process, while waiting for a request from an exterior device, wherein said controller unit causes said data storage apparatus to receive said request from an exterior device to write user data in a designated region of said recording medium, suspend the background formatting process, by suspending the writing of said dummy data in said recording medium, if the background formatting process is in progress, write said user data in said designated region, determine whether said designated region has been certified, verify and certify, if said designated region has not been certified, said user data written in said designated region, write, if a portion of said designated region is found to be defective, a portion of the stored user data corresponding to user data written in the defective portion of said designated region, in a predetermined alternative region of said recording medium, and resume the background formatting process, by resuming the writing of said dummy data in said recording medium, if the background formatting process was suspended.

5. An information processing system, comprising:

a host computer;

a recording medium; and a data storage apparatus connected to said host computer, capable of certifying said recording medium by using an optical disk drive for writing dummy data in said recording medium and verifying said dummy data in a background formatting process while waiting for a request from said host computer, which stores user data provided from said host computer, receives said request from said host computer to write said user data in a designated region of said recording medium, suspends the background formatting process by suspending the writing of said dummy data in said recording medium, if the background formatting process is in progress, writes said user data in said designated region, determines whether said designated region has been certified, verifies and certifies, if said designated region has not been certified while waiting for said request from said host computer, said user data written in said designated region, writes, if a portion of said designated region is found to be defective, a portion of the stored user data corresponding to user data written in the defective portion of said designated region, in a predetermined alternative region of said recording medium, and resumes the background formatting process, by resuming the writing of said dummy data in said recording medium, if the background formatting process was suspended.

6. A method of writing data provided from an exterior device, in a recording medium, comprising:

a step of certifying, while waiting to receive a request from said external device, said recording medium, through a background formatting process comprising using an optical disk drive for writing dummy data in said recording medium and verifying said dummy data;

a step of receiving said request from said exterior device to write data in a designated region of said recording medium;

determining whether the background formatting process is in progress, and then suspending the background formatting process, by suspending the writing of dummy data in said recording medium;

a step of writing said data in said designated region;

a step of determining whether said certification of said designated region has been completed;

a step of verifying and certifying, if said designated region has not been certified, said data written in said designated region;

determining whether a portion of said designated region is found to be defective, and then writing a portion of said data corresponding to data written in the defective portion of said designated region, in a predetermined region of said recording medium; and a step of resuming the background formatting process, by resuming the writing of said dummy data in said recording medium.

* * * * *